US012198874B2

(12) United States Patent
Crespo

(10) Patent No.: US 12,198,874 B2
(45) Date of Patent: Jan. 14, 2025

(54) MAGNETIC KEYCAP ASSEMBLY FOR MECHANICAL KEYBOARD

(71) Applicant: Crespo Computing Creations Holding Corporation, Miami, FL (US)

(72) Inventor: Julian Manuel Crespo, Miami, FL (US)

(73) Assignee: Crespo Computing Creations Holding Corporation, Miami, FL (US)

( * ) Notice: Subject to any disclaimer, the term of this patent is extended or adjusted under 35 U.S.C. 154(b) by 0 days.

(21) Appl. No.: 18/103,439

(22) Filed: Jan. 30, 2023

(65) Prior Publication Data

US 2023/0253168 A1 Aug. 10, 2023

Related U.S. Application Data

(60) Provisional application No. 63/308,655, filed on Feb. 10, 2022.

(51) Int. Cl.

*H01H 13/14* (2006.01)
*H01H 13/04* (2006.01)
*H01H 13/20* (2006.01)

(52) U.S. Cl.

CPC ............ *H01H 13/14* (2013.01); *H01H 13/04* (2013.01); *H01H 13/20* (2013.01)

(58) Field of Classification Search

CPC ........ H01H 13/14; H01H 13/04; H01H 13/20; H01H 13/84; H01H 2217/024; H01H 2219/004; H01H 13/83; H01H 13/70; H01H 13/705; H01H 13/7065; H01H 3/122; H01H 3/125; H01H 2233/07; H01H 2221/066

See application file for complete search history.

(56) References Cited

U.S. PATENT DOCUMENTS

| | | | | |
|---|---|---|---|---|
| 7,157,651 | B2 | 1/2007 | Rix et al. | |
| 8,759,699 | B2 * | 6/2014 | Yuasa .................. | H01H 13/023 200/344 |
| 8,847,890 | B2 | 9/2014 | Peterson et al. | |
| 9,293,278 | B2 | 3/2016 | Bokma et al. | |
| 9,978,543 | B1 | 5/2018 | Loo et al. | |
| 11,551,887 | B2 * | 1/2023 | Chen .................... | H01H 13/705 |

(Continued)

FOREIGN PATENT DOCUMENTS

| | | |
|---|---|---|
| CN | 200962379 Y | 10/2007 |
| CN | 101123146 A | 2/2008 |

(Continued)

OTHER PUBLICATIONS

Anonymous, 2Pcs Personalized Classic Retro Computer Keycaps W/Magnetic Keyboard, Jumia Dec. 13, 2021.

(Continued)

*Primary Examiner* — Lheiren Mae A Caroc

(57) ABSTRACT

A magnetic keycap assembly adapted for use on a mechanical keyboard. The magnetic keycap assembly includes a keycap removably attached to a keybase using a diverse combination of attachments including magnets, and a press-fit configuration for securely retaining the keycap to the keybase when subjected to actuation forces during use. The magnetic keycap assembly comprises a variety of different key profiles including a spacebar, and is customized with interchangeable keycaps to enhance the aesthetic appeal, and/or ergonomic use of mechanical keyboards.

16 Claims, 6 Drawing Sheets

(56) References Cited

U.S. PATENT DOCUMENTS

| | | | | |
|---|---|---|---|---|
| 11,862,410 | B2 * | 1/2024 | Chen .................... | H01H 13/705 |
| 2004/0218963 | A1 | 11/2004 | Diepen et al. | |

FOREIGN PATENT DOCUMENTS

| | | | |
|---|---|---|---|
| CN | 101483678 | B | 10/2012 |
| CN | 204425322 | U | 6/2015 |
| CN | 103681065 | B | 10/2015 |
| CN | 205924949 | U | 2/2017 |
| CN | 205943859 | U | 2/2017 |
| CN | 106024468 | B | 12/2018 |
| CN | 110047681 | A | 7/2019 |
| CN | 211208294 | U | 8/2020 |
| CN | 112825290 | A | 5/2021 |
| WO | 2018010399 | A1 | 1/2018 |
| WO | 2018010399 | A9 | 4/2018 |

OTHER PUBLICATIONS

Anonymous, DOTA 2 Series Magnetic Keycaps 8 Types Mechanical Keyboard, ETSY Disclosing novelty keycaps secured magnetically.

Anonymous, Geekhack Keyboard Enthusiasts, Simple Machines 2017.

Dhiram Shah, Embotec keyboard uses Magnetic levitation, AVING. newsnetwork, Mar. 27, 2007, Disclosing magnetic keycaps with indexing tabs.

* cited by examiner

DETAIL A

DETAIL B

DETAIL C

MAGNETIC KEYCAP ASSEMBLY FOR MECHANICAL KEYBOARD

CROSS-REFERENCE

This application claims priority to U.S. Provisional Patent Application Ser. No. 63/308,655 filed on Feb. 10, 2022, the subject matter of the provisional patent application being incorporated herein in the entirety.

FIELD OF THE INVENTION

The present invention relates to computer accessories and devices, and more particularly, to a magnetic keycap assembly adapted for use on a mechanical keyboard. The magnetic keycap assembly includes a keycap removably attachable to a keybase by a diverse combination of attachments to prevent displacement of the keycap during use, and is easily customized with interchangeable keycaps for enhancing the aesthetic appeal, and/or ergonomic use of the keyboard.

BACKGROUND OF THE INVENTION

A variety of computer accessories are generally employed to operate and interface with computers. One particular accessory comprises a computer keyboard that includes a plurality of keys arranged in a mechanical keyboard configuration for inputting information and data. Each key is selectively operated by users to generate an electrical signal that is processed as an input by a computer. Keys generally comprise keycaps that are mounted to key switches provided on mechanical keyboards. Each keycap is typically earmarked with indicia associated with alphanumeric characters including letters, and/or numbers disposed on the upper surface, and/or frontal sides of the keycaps to provide visual indication to users.

Overtime, standard keyboards have been developed to include a diversity of added functionalities and structural changes. For example, added functionalities are operatively assigned to designated keys to assist users in quickly accessing visual display screens, launching or navigating operational programs, and accessing and inputting data and information. Keyboards also include various ergonomic features to increase comfort, impose less strain on the fingers, hands, and wrists of users, and to reduce fatigue, and chronic muscle pain during prolonged periods of use. Smaller, compact, and slimmer keyboards have also been designed to help improve portability and storage.

Individuals often spend prolonged periods of time in front of computers for both personal and business use. As such, efforts have been made to enhance the aesthetic or cosmetic appearance of keyboards to make the experience more appealing to users. Some keyboards, for example include key covers having a variety of different colors that are configured to fit over existing keycaps provided on mechanical keyboards. However, such key covers are challenging and cumbersome to install, and pose various drawbacks. For example, conventional key covers generally include resilient, plastic members for attaching the key cover onto existing keycaps. Repeatedly attaching and removing traditional key covers often results in the attachments weakening and breaking off over time. Also, the forces employed in continuously attaching, and removing key covers on existing keycaps may cause damage to the functional attributes of the underlying key switches thus compromising workability of the keyboard. Further, the resilient attachments are often deficient in firmly retaining the key covers securely in place, resulting in the key covers moving, wobbling, and shifting during use.

Similar challenges exist when users install custom keys on existing keyboards. Often a key puller or other specialized tool is required to remove and replace a key on a keyboard with a customized key. Even with a specialized tool, users risk damaging keys or the keyboard when removing keys because the keys must be forced off of the keyboard. Damage to even a single key can render a keyboard unusable, and so many users who desire to customize keys on a keyboard cannot easily customize their keyboards or simply decide not to risk breaking the keyboard.

Accordingly, there is an established need for a solution to at least one of the aforementioned problems. There remains a need for a magnetic keycap assembly that uses a diverse combination of attachments for securely retaining a keycap to a keybase under repetitive actuation forces, and that allows users to customize the magnetic keycap assembly with interchangeable keycaps to enhance the aesthetic appeal and/or promote the ergonomic use of keyboards without compromising the functional attributes of the keyboard.

SUMMARY OF THE INVENTION

The present disclosure is directed to a magnetic keycap assembly that includes a diverse combination of strategically placed attachments comprising magnets, and press-fit tab configurations for removably attaching keycaps to keybases to prevent the keycaps from shifting, wobbling, or becoming loose as a result of repetitive actuation forces imposed on the keycaps during use. The keybase includes a stem connector adapted for mounting to a key switch of a mechanical keyboard. Interchangeable keycaps including a spacebar are provided for users to customize the magnetic keycap assembly with ease to enhance the aesthetic appeal and/or ergonomics of keyboards.

One embodiment of the present invention provides a magnetic keycap assembly comprising: a keycap including a cap body having a top surface, a bottom surface opposite the top surface, and a first plurality of magnets provided on the bottom surface; a keybase including a base body having an upper surface integral with four sidewalls, each of the four sidewalls extending downwards, a lower surface opposite the upper surface, a stem connector extending from the lower surface, and a second plurality of magnets provided on the upper surface; and wherein the keycap is removably attached to the keybase such that the first plurality of magnets magnetically attach to the second plurality of magnets, the keybase removably attachable to a key switch on a mechanical keyboard via, the stem connector.

In one aspect, the magnetic keycap assembly further includes a first plurality of attachments provided on the bottom surface, and a second plurality of attachments provided on the upper surface, each of the first plurality of attachments engaging each of the second plurality of attachments when the keycap is attached to the keybase.

In one aspect, the first plurality of magnets comprises at least two magnets each embedded within or affixed to the bottom surface, the second plurality of magnets comprises another at least two magnets each embedded within or affixed to the upper surface, the first plurality of attachments comprising at least two tabs, and the second plurality of attachments comprising at least two apertures, each of the at least two tabs inserted within each of the at least two apertures when the keycap is removably attached to the keybase.

In another aspect, the at least two magnets comprises at least four magnets, the another at least two magnets comprises at least four magnets, the at least two tabs comprises at least four tabs, and the at least two apertures comprises at least four apertures, each of the four tabs engaging each of the four apertures when the keycap is attached to the keybase.

In another aspect, each of the at least four magnets comprises six magnets, the at least two tabs comprises six tabs, and the at least four apertures comprises six apertures, the six tabs aligned with and engaging the six apertures when the keycap is removably attached to the keybase.

In yet another aspect, the bottom surface, and the upper surface each comprise a planar surface, the second plurality of attachments being formed within the upper surface.

In one aspect, the cap body, and the base body each comprise an elongate rectangular shape defining a space bar on a mechanical keyboard. The keycap comprises an interchangeable keycap.

Another embodiment provides a magnetic keycap assembly comprising: a keycap including a top surface, a planar bottom surface opposite the top surface, a first plurality of magnets, and a first plurality of attachments, the first plurality of magnets and the first plurality of attachments provided about peripheral edges on the planar bottom surface; a keybase including a planar upper surface integral with four sidewalls, each of the four sidewalls extending downward, a lower surface opposite the planar upper surface, a stem connector extending down from the lower surface, a second plurality of magnets, and a second plurality of attachments, the second plurality of magnets, and the second plurality of attachments provided about peripheral edges on said planar upper surface; and wherein the keycap is removably attached to the keybase such that each of the first plurality of magnets magnetically attach to each of the second plurality of magnets, and each of the first plurality of attachments engages each of the second plurality of attachments, the keybase removably attachable to a key switch on a mechanical keyboard via, the stem connector.

In yet another embodiment, there is provides a magnetic keycap assembly comprising: a keycap including a cap body having a top surface, a planar bottom surface opposite the top surface, at least two keycap magnets each embedded within, or affixed to, the planar bottom surface, and at least two keycap attachments; a keybase including a base body having a planar, upper surface integral with four sidewalls, a lower surface opposite the planar, upper surface, a stem connector extending down from the lower surface, at least two keybase magnets embedded within, or affixed to, the planar upper surface, and at least two keybase attachments; and wherein the keycap is removably attached to the keybase such that the at least two keycap magnets magnetically attach to the at least two keybase magnets, and the at least two keycap attachments engage the at least two keybase attachments, the keybase removably attachable to a key switch on a mechanical keyboard via, the stem connector.

In one aspect, the at least two keycap magnets comprises four keycap magnets each located at designated corners of the planar, bottom surface of the cap body, and the at least two keycap attachments comprises four keycap attachments each situated about peripheral edges on the planar, bottom surface, the four keycap attachments interposed between the four keycap magnets, and wherein the at least two keybase magnets comprises four keybase magnets each located at designated corners on the planar, upper surface of the base body, and the at least two keybase attachments comprises four keybase attachments each situated about peripheral edges on the planar, upper surface, the four keybase attachments interposed between said four keybase magnets.

In another aspect, the at least two keycap magnets comprises six keycap magnets situated at designated corners, and about peripheral edges on the planar, bottom surface of the cap body, and the at least two keycap attachments comprises six keycap attachments situated about peripheral edges on the planar, bottom surface, the six keycap attachments interposed between the six keycap magnets, and the at least two keybase magnets comprises six keybase magnets situated at designated corners, and about peripheral edges on the planar, upper surface of the base body, and the at least two keybase attachments comprises six keybase attachments each situated about peripheral edges on the planar, upper surface, the six keybase attachments interposed between said six keybase magnets.

In one aspect, each of the four keycap attachments, comprises a tab, and each of the four keybase attachments comprises an aperture formed within the planar surface of the upper surface, each tab engaging each aperture in an interface, snap-fit, or press-fit attachment configuration when the keycap is removably attached to the keybase. The plurality of tabs, and the plurality of apertures may comprise any number of tabs and apertures ranging from 2 to 20 in number.

In yet another aspect, the keycap comprises a plurality of interchangeable keycaps each comprising a square shape, a rectangular shape, or elongate rectangular shape defining a space bar on a mechanical keyboard, the plurality of interchangeable keycaps including any of letters, numbers, characters, motifs, designs, patterns, different colors, images, lights, light emitting diodes, indentations, protrusions, padding, braille, frictional elements, embossed structural features, or indicia.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION

The following detailed description is merely exemplary in nature and is not intended to limit the described embodiments or the application and uses of the described embodiments. Terms and phrases used in this document, and variations thereof, unless otherwise expressly stated, should be construed as open ended as opposed to limiting. The term "including" should be read as meaning "including, without limitation" or the like; the terms "illustrative", "exemplary", or "example" is used to provide exemplary instances or illustrations of the item in discussion, and not an exhaustive or limiting list thereof, or not construed as preferred or advantageous over other implementations; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the use of plurals can also refer to the singular, including without limitation when a term refers to one or more of a particular item; likewise, the use of a singular term can also include the plural, unless the context dictates otherwise.

All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is understood that the specific devices and processes illustrated in the attached drawings, and described in the following specification, are simply exemplary embodiments of the inventive concepts defined in the appended claims. Hence, specific dimensions, exploded views, and other physical characteristics relating to the embodiments disclosed herein are not limiting, unless the claims expressly state otherwise.

Figure 1:
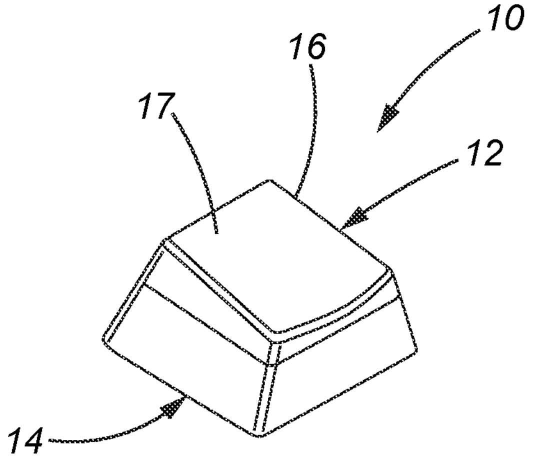
FIG. 1 is a perspective view of a magnetic keycap assembly, in accordance with one embodiment of the present invention.
Figure 2:
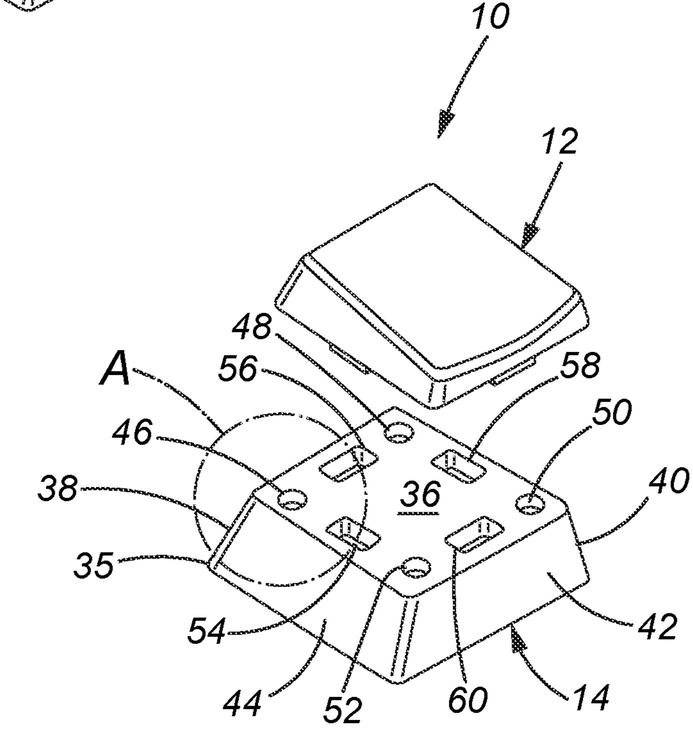
FIG. 2 is an exploded, perspective view of the magnetic keycap assembly of FIG. 1, showing a keycap removed from a keybase for exposing a plurality of keybase magnets, and a plurality of apertures provided on a planar, upper surface of the keybase.

Referring now to the figures wherein like elements are represented by like numerals throughout, there is shown in FIGS. 1 and 2, a perspective view, and an exploded, perspective view, respectively, of a magnetic keycap assembly 10, in accordance with one embodiment of the present invention. The magnetic keycap assembly 10 comprises a keycap 12 removably, magnetically attached to a keybase 14 that is adapted for mounting to a key switch on a mechanical keyboard. The magnetic keycap assembly 10 generally comprises an overall square or rectangular geometry which corresponds to the general shapes of keys provided on mechanical keyboards. Keycap 12 includes a generally square or rectangular cap body 16 having a first side defining a top surface 17, and a second side defining a planar, bottom surface 18 directly opposite the top surface 17, as better illustrated in FIG. 4. In one, non-limiting example, the top surface 17 includes ergonomic features comprising a concave depression for accommodating the rounded, distal contours of a user's fingers during use.

Figure 4:
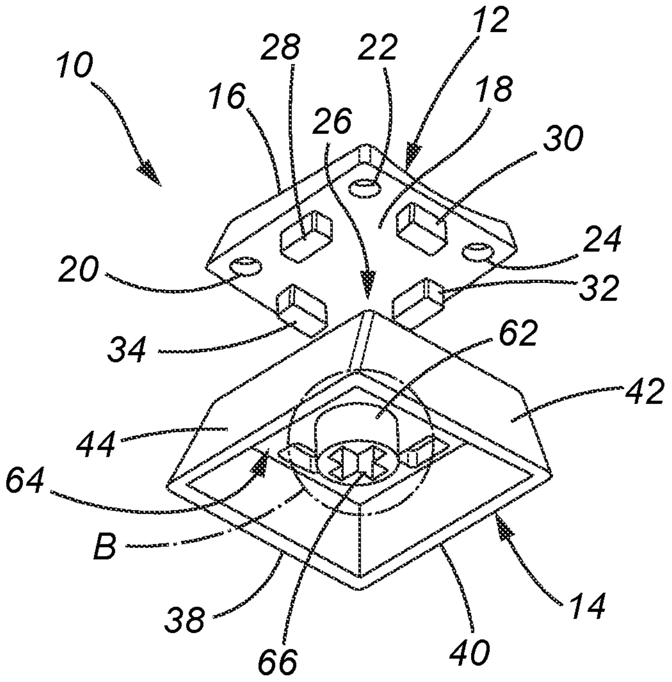
FIG. 4 is an exploded, bottom, perspective view of the magnetic keycap assembly of FIG. 1, showing a plurality of keycap magnets, and a plurality of tabs, provided on the planar, bottom surface of the keycap, and a stem connector provided on a bottom surface of the keybase for mounting the magnetic keycap assembly to a key switch of a mechanical keyboard.

As shown in FIG. 4, there is provided a diverse, combination of attachments for removably attaching the keycap 12 securely to the keybase 14 to prevent the keycap 12 from wobbling, moving, shifting or sliding as a result of repetitive, actuation or operating forces applied to the keycap 12 during use. Actuation or operating forces affect the performance of keys, and operation of mechanical keyboards. Actuation force is denoted as the amount of pressure needed to press down on a key of a keyboard to achieve an actuation point which generates an electrical signal for input into a computer. Dynamic forces attributed to linear, lateral, and/or torsion forces often result in conventional keycaps or key covers becoming loose overtime as a result of repeated actuation forces applied during use. To overcome this drawback, the magnetic keycap assembly 10 comprises a keycap 12 that includes a plurality of keycap magnets 20, 22, 24, 26 provided on the planar, bottom surface 18 of the cap body 16. In one, exemplary embodiment, the plurality of keycap magnets 20, 22, 24, 26 comprise a total of four magnets that are strategically placed at designated regions on the planar, bottom surface 18. In one embodiment, each designated region comprises a corner area defined by the square or rectangular geometry of cap body 16. Each of the plurality of keycap magnets 20, 22, 24, 26 is affixed to the corners using any well-known material or method including for example, an adhesive, a glue, a silicone material, or an over-molding process. In one non-limiting embodiment, a plurality of notches or bores comprising four notches or bores are each formed within the planar, bottom surface 18 of the cap body 16 for securely receiving each of the keycap magnets 20, 22, 24, 26 therein such that the exposed outer surface of each keycap magnet lays coplanar with the planar, bottom surface 18. In one exemplary embodiment, each keycap magnet may comprise a cylindrical shape having a diameter of 2.01 mm, and a depth of 1 mm, where each of the notches are sized to accommodate the shape and diameter of each keycap magnet. It is contemplated that each of the plurality of notches and keycap magnets may comprise varying geometric shapes, sizes or dimensions.

To prevent actuation forces from displacing the keycap 12 about the keybase 14 during use, there is provided a second, attachment configuration comprising an interface, snap-fit, or press-fit attachment configuration. The second attachment configuration comprises keycap attachments including a plurality of tabs denoted at 28, 30, 32, 34 provided on the planar, bottom surface 18 of cap body 16. Each of the plurality of tabs 28, 30, 32, 34 are configured to removably extend within each of a corresponding plurality of apertures 54, 56, 58, 60 provided on the planar, upper surface 36 of keybase 14, as better illustrated in FIG. 2. In one, exemplary embodiment, the plurality of tabs 28, 30, 32, 34 comprise a total of four tabs each including a generally square or rectangular shape that are strategically located at designated regions on the planar, bottom surface 18. In construction, the plurality of tabs 28, 30, 32, 34 can be separately affixed to, or integrally formed with, the cap body 16. It is understood that the plurality of tabs 28, 30, 32, 34 can comprise any number of tabs each having a same or different geometric shape, and arranged in any orientation and/or location on the planar, bottom surface 18 of keycap 12. In one, non-limiting embodiment, each designated region is located about the peripheral, outer edges on the square or rectangular cap body 16, with each of the plurality of tabs 28, 30, 32, 34 interposed or oriented in-between keycap magnets 20, 22, 24, 26, as better illustrated in FIG. 4. For example, tab 28 is disposed in-between keycap magnets 20, 22, tab 30 is disposed in-between keycap magnets 22, 24, tab 32 is disposed in-between keycap magnets 24, 26, and tab 34 is disposed in-between keycap magnets 26 and 20.

Figure 3:
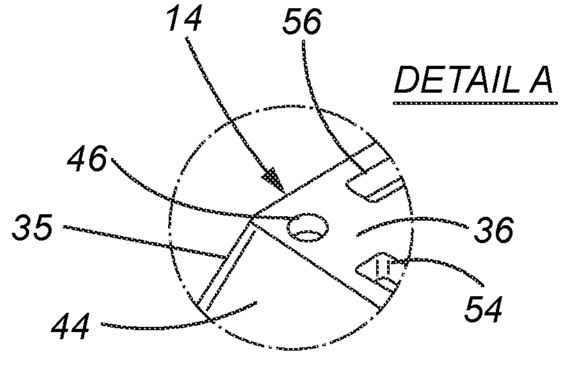
FIG. 3 is a magnified, partial, perspective view of the keybase taken along section A of FIG. 2, showing the strategic location and orientation of one of the plurality of keybase magnets adjacent a plurality of apertures.

Turning now to FIGS. 2 and 3, there is provided an exploded, perspective view of the magnetic keycap assembly of FIG. 1, and a magnified, partial, perspective view of keybase 14 taken along section A of FIG. 2. Keybase 14 includes a generally rectangular or square base body 35 including a planar, upper surface 36 integral with sidewalls 38, 40, 42, 44 that each extend downwards, and diverge slightly outwards, and a lower surface 64 opposite the planar, upper surface 36 as noted in FIG. 4. The base body 35 is geometrically shaped and sized to accommodate receiving keycap 12 on the planar, upper surface 36 so that the outer side surfaces of keycap 12 are coplanar with the planar, outer surfaces of sidewalls 38, 30, 42, 44 resulting in the magnetic keycap assembly 10 having smooth, contiguous outer surfaces. It is appreciated that each sidewall 38, 30, 42, 44 may be curved, angled, sloped, or vertical, and include an outer surface that is planar, non-planar, concave or convex.

Keybase 14 includes a plurality of keybase magnets 46, 48, 50, 52 each provided on the planar, upper surface 36 of the base body 35 to secure, and prevent keycap 12 from wobbling, moving, shifting or sliding along the upper surface of the keybase 14 as a result of repetitive actuation forces applied to the top surface 17 of the keycap 12 during use. Each of the plurality of keybase magnets 46, 48, 50, 52 is affixed to respective corners of the planar, upper surface 36 of base body 35 to accommodate releasable attachment to the plurality of keycap magnets 20, 22, 24, 26 provided on cap body 16. In one, exemplary embodiment, the plurality of keybase magnets 46, 48, 50, 52 comprise a total of four magnets strategically provided at designated corners of the planar, upper surface 36 of the keybase 14. As a representative example illustrated in FIG. 3, there is shown a keybase magnet 46 located at a corner of the base body 35 adjacent apertures 54 and 56. Each of the plurality of keybase magnets 46, 48, 50, 52 are affixed to the base body 35 using any well-known material or technique including, for example, an adhesive, a glue, a silicone material, or an over-molding technique. In one embodiment, there may be provided a plurality of notches or bores comprising a total of four notches or bores are formed within the base body 35 for each receiving a keybase magnet 46, 48, 50, 52 therein such that the exposed outer surface of each keybase magnet lays coplanar with the planar, upper surface 36. In one exemplary embodiment, each keybase magnet 46, 48, 50, 52 may comprise a cylindrical shape having a diameter of 2.01 mm and a depth of 1 mm, where each of the notches are sized to accommodate the shape and diameter of each keycap magnet. It is appreciated that each of the plurality of keycap magnets 20, 22, 24, 26, and each of the plurality of keybase magnets 46, 48, 50, 52 may comprise any shape, size, and/or diameter, and may comprise a permanent magnet constructed from a strong magnet material such as neodymium iron boron (NdFeB), or constructed from other magnetic materials including samarium cobalt (SmCo), Alnico, Ceramic, or Ferrite magnets.

With continued reference to FIGS. 2 and 3, keybase 14 includes a second attachment configuration comprising keybase attachments including a plurality of apertures 54, 56, 58, 60 formed within the planar, upper surface 36 of the keybase 14 to accommodate receiving the plurality of tabs 28, 30, 32, 34 therein to provide an interface, snap-fit or press-fit attachment for further withstanding repetitive actuation forces imposed on the keycap 12 during use. The shape and dimension of each of the plurality of apertures 54, 56, 58, 60 is selected to receive each of the plurality of apertures 54, 56, 58, 60 therein. In one embodiment, each of the plurality of apertures 54, 56, 58, 60 may extend completely through the base body 35 where each aperture includes an open bottom, or alternatively, each of the plurality of apertures 54, 56, 58, 60 may extend partially within the base body 35, where each aperture includes a closed bottom. It is understood that each of the plurality of tabs 28, 30, 32, 34 may include physical attributes that are employed for use as a snap-fit arrangement including for example, providing resilient or spring-like arms, or are dimensioned to accommodate a press-fit attachment. In one, exemplary embodiment, the plurality of apertures 54, 56, 58, 60 comprise a total of four apertures strategically located about the peripheral edges of the planar, upper surface 36 of the keybase 14, as better illustrated in FIG. 2. To properly align the plurality of apertures 54, 56, 58, 60 with the plurality of tabs 28, 30, 32, 34, the plurality of apertures 54, 56, 58, 60 are similarly interposed or oriented in-between keybase magnets 46, 48, 50, and 52. For example, aperture 54 is disposed between keybase magnets 46 and 52, aperture 56 is situated in-between keybase magnet 46 and 48, aperture 58 is between keybase magnet 48 and 50, and aperture 60 is located in-between keybase magnet 50 and 52. To better illustrate the physical layout of the keybase magnets and apertures, there is provided a magnified, partial, perspective view in FIG. 3 which illustrates the strategic placement of one of the plurality of keybase magnets 46 situated adjacent two of the plurality of apertures 54, and 56. As shown, one of the plurality of keybase magnets 46 is located in the corner region of base body 35, and displaced a predefined distance from apertures 54, 56 each situated along the outer edges of the planar, upper surface 36 of the base body 35.

The strategic orientation, location, and combination of the plurality of keybase magnets 46, 48, 50, 52, plurality of keycap magnets 20, 22, 24, 26, plurality of tabs 28, 30, 32, 34, and plurality of apertures 54, 56, 58, 60 provides a diverse combination of attachments needed to securely attach keycap 12 to the keybase 14 to prevent the keycap 12 from becoming loose or being displaced as a result of repeated actuation forces applied to the planar, top surface 17 of the keycap 12 during use.

Figure 5:
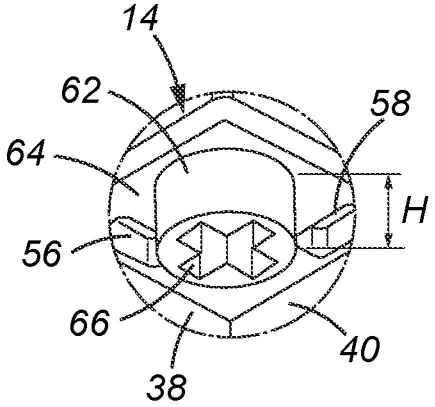
FIG. 5 is a partial, bottom, perspective view of the keybase taken along section B of FIG. 4, showing the stem connector extending downwards from the central region of the bottom surface of the keybase.

Turning now to FIGS. 4 and 5, there is shown an exploded, bottom, perspective view of the magnetic keycap assembly 10, and a partial, bottom, perspective view of the keybase 14 taken along section B of FIG. 4, respectively. Keybase 14 includes a stem connector 62 extending downwards from a central region of a lower surface 64 of base body 35, and is surrounded by sidewalls 38, 40, 42, and 44. Mechanical key switches of keyboards generally comprise a linear key switch, a tactile key switch, or a click switch that are employed for generating an electrical input signal for computers to process. Such mechanical key switches generally comprise various components including, for example, a keycap, a stem, an upper housing to accommodate receipt of the stem, a coil spring, a holding base, and a cross-point contact. The magnetic keycap assembly 10 is adapted for mounting to a mechanical keyboard by directly attaching the stem connector 62 to the stem of a key switch provided on a mechanical keyboard. The constructional dimensions of stem connector 62 are generally governed by various switching attributes including keycap stroke, key travel distance, and point of actuation. In one exemplary embodiment, stem connector 62 comprise a height H of 2.45 mm, and a diameter of 4.3 mm. The stem connector 62 includes a stem opening 66 formed within the body of the stem connector 62 for attaching the keybase 14 to the stem of a key switch (not shown) on a mechanical keyboard. In an exemplary embodiment, stem opening 66 replicates the shape of a plus sign, but may comprise any shape including a circular or rectangular shape. The dimensional size and shape of stem opening 66 is typically constructed in accordance with the brand or type of mechanical key switch employed on a mechanical keyboard. It is appreciated that any number of plurality of magnetic keycap assemblies 10 are used to configure or customize a functional, mechanical keyboard. In particular embodiments, stem connector 62 can be any type of keyboard connectors, such as, for example, integrated mounts, snap-on mounts, Cherry MX mounts, Hirose Cherry mounts, customer cruciform mounts, tee and bar mounts, Alps mounts, IBM Beam Spring mounts, Electric mounts, RAFI mounts, Mitsumi mounts, Key Tronic mounts, Topre mounts, Clare-Pendar mounts, Marquardt mounts, or any other keyboard key connector.

Figure 6:
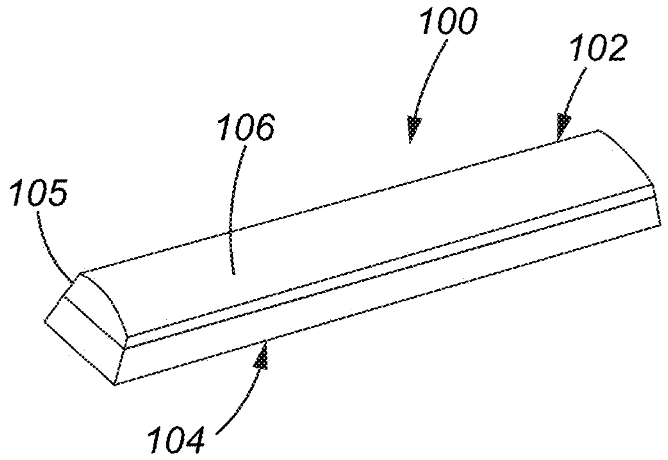
FIG. 6 is a top, perspective view of a magnetic keycap assembly, showing a keycap removably attached to a keybase defining a spacebar for attaching to a key switch on a mechanical keyboard, in accordance with an alternative embodiment of the present invention.

Referring now to FIG. 6 there is shown a top, perspective view of a magnetic keycap assembly 100, in accordance with an alternative embodiment of the present invention. The magnetic keycap assembly 100 comprises a keycap 102 removably, magnetically attached to a keybase 104 using a diverse combination of attachments, and adapted for mounting to a mechanical keyboard. Keycap assembly 100 comprises an elongate, rectangular geometry that correlates to the shape of a spacebar provided on mechanical keyboards. As such, keycap 102 includes an elongate, rectangular cap body 105 having a top surface 106, and a planar, bottom surface 108 opposite the top surface 106, as better illustrated in FIG. 7. In one, non-limiting example, the top surface 106 may include any ergonomic configuration including for example, an upper convex structure, or protruding surface for accommodating a user's thumbs during use.

Figure 7:
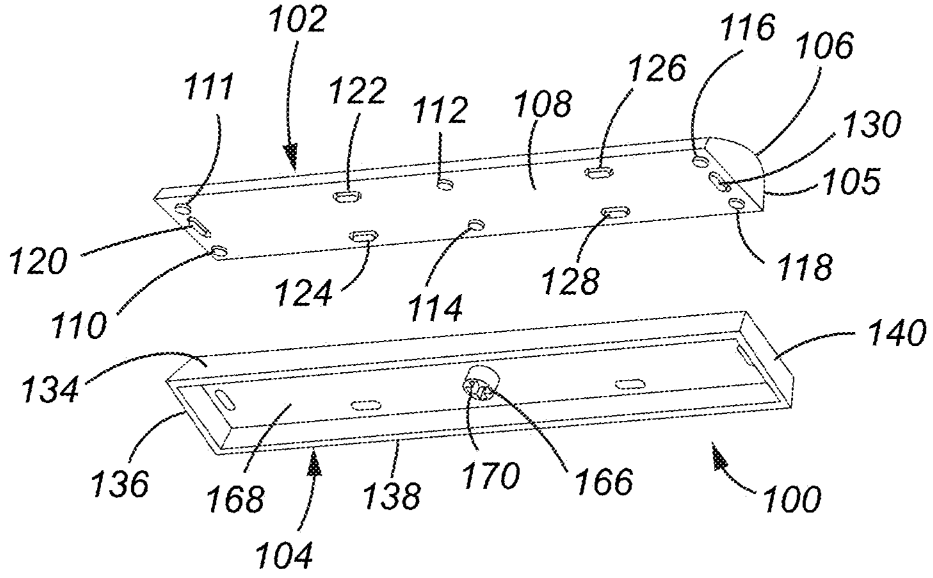
FIG. 7 is an exploded, bottom, perspective view of the magnetic keycap assembly of FIG. 6, showing a plurality of keycap magnets, and a plurality of tabs, provided on a planar, bottom surface of the keycap, and a stem connector provided on a bottom surface of the keybase for mounting the magnetic keycap assembly to a key switch of a mechanical keyboard.

As shown in FIG. 7, there is provided a diverse, combination of attachments for removably attaching keycap 102 to the keybase 104 to prevent the keycap 102 from wobbling, moving, shifting or sliding as a result of repetitive, actuation or operating forces applied to the upper surface 106 of the keycap 102 during use. One diverse attachment comprises a plurality of keycap magnets 110, 111, 112, 114, 116, 118 provided on the planar, bottom surface 108 of the cap body 105. In one, exemplary embodiment, the plurality of keycap magnets 110, 111, 112, 114, 116, 118 comprise a total of six magnets strategically located at designated regions on the planar, bottom surface 108. In one embodiment, such designated regions comprise corner areas defined by the rectangular geometric shape of cap body 105, and peripheral outer edges of the cap body 105. Each of the plurality of keycap magnets 110, 111, 112, 114, 116, 118 is affixed to the planar, bottom surface 108 using any well-known material or method including for example, an adhesive, a glue, a silicone material, or an over-molding process. In one non-limiting embodiment, a plurality of notches or bores comprising six notches or bores are each formed within the planar, bottom surface 108 of the cap body 105 for receiving each of the keycap magnets 110, 111, 112, 114, 116, 118 therein such that the exposed outer surface of each keycap magnet is coplanar with the planar, bottom surface 108. In one exemplary embodiment, each keycap magnet may comprise the same or different shape and dimension as that of each of the plurality of keycap magnets 20, 22, 24 and 26.

A second diverse attachment comprising an interface, snap-fit, or press-fit attachment that is employed to further secure keycap 102 to keybase 104. A plurality of tabs 120, 122, 124, 126, 128, 130 are provided on the planar, bottom surface 108 of cap body 105. Each of the plurality of tabs 120, 122, 124, 126, 128, 130 are configured to fit into a corresponding plurality of apertures 154, 156, 158, 160, 162, 164 provided on the planar, upper surface 133 of keybase 104, as better illustrated in FIG. 8. In one, exemplary embodiment, the plurality of tabs 120, 122, 124, 126, 128, 130 comprise a total of six tabs each comprising a generally square or rectangular geometry, and situated at designated regions on the planar, bottom surface 108. In construction, the plurality of tabs 120, 122, 124, 126, 128, 130 are separately affixed to, or integrally formed with, cap body 105. It is understood that the plurality of tabs 120, 122, 124, 126, 128, 130 may comprise any number of tabs each having a same or different geometric shape that are arranged in any orientation and/or location on the planar, bottom surface 108 of cap body 105. In one, non-limiting embodiment, such designated regions are located at various areas along the peripheral edges on the cap body 105. For example, tabs 120, 130 are located at distal ends of the cap body 105 in-between keycap magnets 110, 111, and 116, 118, respectively, tabs 122, 124 are situated along the peripheral edges on the cap body 105 and interposed or situated in-between keycap magnets 111, 112, and 110, 114, respectively, and tabs 126, 128 are situated along the peripheral edges of the cap body 105 in-between keycap magnets 112, 116, and 114, 118, respectively.

Figure 8:
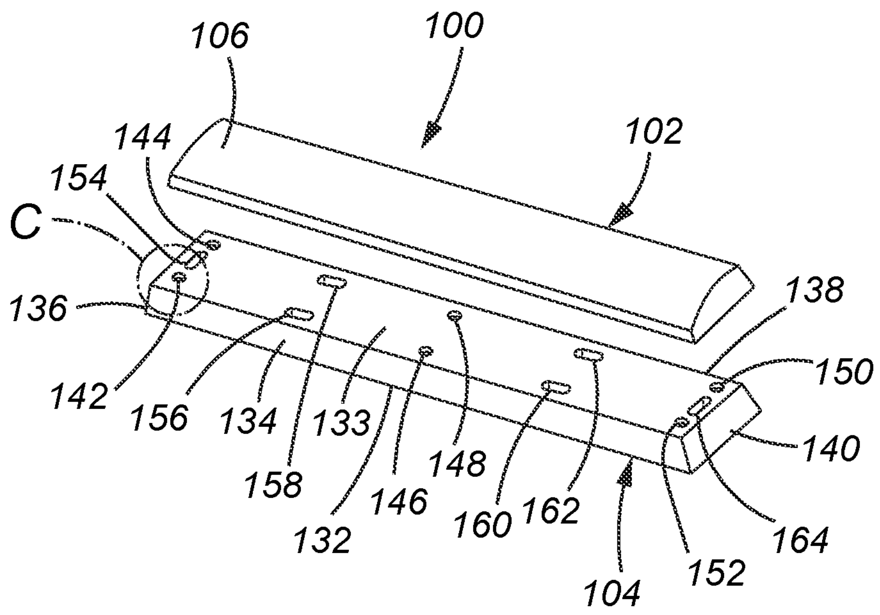
FIG. 8 is an exploded, perspective view of the magnetic keycap assembly of FIG. 6, showing the keycap removed from a keybase for exposing a plurality of keybase magnets, and a plurality of apertures, provided on the upper, planar surface of the keybase, in accordance with the alternative embodiment of the present invention.

As shown in FIGS. 7 and 8, base body 132 includes a planar, upper surface 133 integral with sidewalls 134, 136, 138, 140 that each extend downwards and diverge slightly outwards. The base body 132 is geometrically shaped and sized to accommodate receiving keycap 102 on the planar, upper surface 133 so that the outer side surfaces of keycap 102 are coplanar with the planar, outer surfaces of sidewalls 134, 136, 138, 140 resulting in the magnetic keycap assembly 100 including smooth, contiguous outer surfaces. It is appreciated that each sidewall 134, 136, 138, 140 may be curved, angled, sloped, or vertical, and include an outer surface that is planar, non-planar, concave or convex surface.

Figure 9:
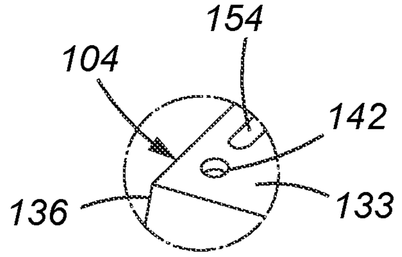
FIG. 9 is a magnified, partial, perspective view of the keybase, taken along section C of FIG. 8, showing the strategic orientation and alignment of one of the plurality of keybase magnets adjacent one of a plurality of apertures.

With reference to FIGS. 8 and 9, there is provided an exploded, perspective view of the magnetic keycap assembly 100 of FIG. 6, and a magnified, partial, perspective view of the keybase 104 taken along section C of FIG. 8, respectively. Keybase 104 includes a plurality of keybase magnets 142, 144, 146, 148, 150, 152 provided on the planar, upper surface 133 of base body 132 to further removably, secure, and prevent the keycap 102 from wobbling, moving, shifting or sliding along the upper surface 133 of the keybase 104 as a result of repetitive actuation forces applied to the top surface 106 of the keycap 102 during use. Each of the plurality of keybase magnets 142, 144, 146, 148, 150, 152 is affixed to respective corners of the planar, upper surface 133 of the base body 132 to accommodate releasable attachment to the plurality of keycap magnets 110, 111, 112, 114, 116, 118 provided on cap body 105. In one, exemplary embodiment, the plurality of keybase magnets 142, 144, 146, 148, 150, 152 comprise a total of six magnets physically arranged at designated corners, and along the peripheral edge of the planar, upper surface 133 of the base body 132. Each of the plurality of keybase magnets 142, 144, 146, 148, 150, 152 are affixed to base body 133 using any well-known material or technique including, for example, an adhesive, a glue, a silicone material, or an over-molding technique. In one embodiment, a plurality of notches or bores comprising a total of six notches or bores are each formed within base body 132 for receiving a corresponding keybase magnet 142, 144, 146, 148, 150, 152 therein such that the exposed outer surface of each keybase magnet is coplanar with the planar, upper surface 133. In one exemplary embodiment, each keybase magnet may comprise the same or different size and shape of keycap magnets 110, 111, 112, 114, 116, 118. Each of the plurality of keycap magnets 110, 111, 112, 114, 116, 118, and each of the plurality of keybase magnets 142, 144, 146, 148, 150, 152 may comprise any shape, size, and/or diameter, and may comprise a permanent magnet constructed from a strong magnet material such as neodymium iron boron (NdFeB), or constructed from other magnetic materials including samarium cobalt (SmCo), Alnico, Ceramic, or Ferrite magnets.

In one embodiment, either the plurality of keycap magnets 20, 22, 24, 26, or the plurality of keybase magnets 46, 48, 50, 52 associated with the magnetic keycap assembly 10, may be replaced with metal elements each strategically affixed in the same location as either the replaced plurality of keybase magnets, or alternatively, the replaced plurality of keycap magnets. For example, a plurality of metal elements equal in number to the plurality of keycap magnets 20, 22, 24, 26 may be attached to the planar, bottom surface 18 of keycap 12, at the same locations as that of the replaced plurality of keycap magnets 20, 24, 26, and 28. Upon removably attaching keycap 12 to keybase 14, the plurality of keybase magnets 46, 48, 50, 52 releasably, magnetically adhere to the metal elements provided on the keycap 12 when removably attached to keybase 14. Each metal element may be directly attached to the planar, bottom surface 18 of the keycap 12, or alternatively, may be disposed within notches or bores formed within the planar, bottom surface 18 of the cap body 16 using any well-known material or technique including for example, an adhesive, a glue, a silicone material, or an over-molding technique where the exposed surface of the metal element is coplanar with the planar, bottom surface 18.

Similarly, in one alternative embodiment, either the plurality of keycap magnets 110, 111, 112, 114, 116, 118, or the plurality of keybase magnets 142, 144, 146, 148, 150, 152 associated with magnetic keycap assembly 100, may also be replaced with metal elements that are each strategically affixed in the same location as either the replaced plurality of keybase magnets, or alternatively, the replaced plurality of keycap magnets. For example, a plurality of metal elements equal in number to the plurality of keycap magnets 110, 111, 112, 114, 116, 118 may be attached to the planar, bottom surface 108 of the keycap 102, at the same locations of the plurality of keycap magnets 110, 111, 112, 114, 116, and 118. Upon removably attaching keycap 102 to keybase 104, the plurality of keybase magnets 110, 111, 112, 114, 116, 118 magnetically adhere to the metal elements provided on the keycap 102 when removably attached to keybase 104. Each metal element may be directly attached to the planar, bottom surface 108 of the keycap 102, or alternatively, may be disposed within notches or bores formed within the planar, bottom surface 108 of the cap body 105 using any well-known material or technique including for example, an adhesive, a glue, a silicone material, or an over-molding technique where the exposed surface of the metal element is coplanar with the planar, bottom surface 108. It is appreciated that each of the metal elements employed in the magnetic keycap assembly 10, 100 may comprise any size, dimension, or geometric shape including square, round, cylindrical, rectangular, ellipse, or oblong.

With continued reference to FIGS. 8 and 9, a diverse attachment configuration is provided for removably, securing the keycap 102 to keybase 104. The diverse attachment comprises a plurality of apertures 154, 156, 158, 160, 162, 164 each formed within the planar, upper surface 133 of the base body 132 to accommodate receiving the plurality of tabs 120, 122, 124, 126, 128, 130 providing an interface, snap-fit or press-fit attachment. Each of the plurality of apertures 154, 156, 158, 160, 162, 164 is correspondingly shaped to accommodate the shape of each of the plurality of tabs 120, 122, 124, 126, 128, 130. Each of the plurality of apertures 154, 156, 158, 160, 162, 164 may be formed completely through the base body 132, or alternatively, formed partially within the base body 132 where each aperture includes a closed bottom. It is understood that each of the plurality of tabs 120, 122, 124, 126, 128, 130 may be designed as a snap-fit arrangement including for example, resilient or spring-like arms, or designed to accommodate a press-fit attachment. In one, exemplary embodiment, the plurality of apertures 154, 156, 158, 160, 162, 164 comprise a total of six apertures strategically located about the peripheral edges of the planar, upper surface 133 of the keybase 104, as better illustrated in FIG. 8. To properly align the plurality of apertures 154, 156, 158, 160, 162, 164 with the plurality of tabs 120, 122, 124, 126, 128, 130, the plurality of apertures 154, 156, 158, 160, 162, 164 are oriented in corresponding locations similar to positioning of the plurality of tabs 120, 122, 124, 126, 128, and 130. As such, the plurality of apertures 154, 156, 158, 160, 162, 164 are located at designated regions on the planar, bottom surface 133 of the keybase 104 including at distal ends of the cap body 105 in-between keycap magnets 142, 144, and 150, 152, respectively, apertures 156, 158 are situated along the peripheral edges of the upper surface 133 between keycap magnets 142, 146 and 144, 148, respectively, and apertures 160, 162 are situated along the peripheral edges of the upper surface 133 between keycap magnets 146, 152, and 148, 150, respectively. As illustrated in the magnified, partial, perspective view in FIG. 9, there is shown an exemplary arrangement of one keybase magnet 142 located at a corner region of the planar, upper surface 133, adjacent aperture 154 arranged along the peripheral, outer edge of the planar, upper surface 133. It is understood that the diverse, combination of attachments including the plurality of keycap magnets, the plurality of keybase magnets, the plurality of tabs, and the strategic, positioning and orientation of the plurality of keycap magnets, the plurality of keybase magnets, the plurality of tabs, and the plurality of apertures of keycap 12, 102, and keybase 14, 104, respectively, provide a structural, even weight distribution for maintaining optimum functionality of the magnetic keycap assembly 10, 100, and for an enhanced, secure attachment of the keycap 12, 102 to respective keybases 14, 104 to prevent displacement, movement or detachment of keycaps 12, 102 due to actuated actuation forces imposed on each magnetic keycap assembly 10, 100 by users during use.

In one exemplary embodiment, the diverse combination of attachments provided on both the keycap 12, and keybase 14, may be arranged conversely such that the plurality of tabs 34, 38, 40, 42 provided on keycap 12, and the plurality of tabs 120, 122, 124, 126, 128, 130 provided on keycap 102, are alternatively provided on keybases 14, 104, respectively, and the plurality of apertures 54, 56, 58, 60 provided on keybase 14, and plurality of apertures 154, 156, 158, 160, 162, 164 provided on keybase 104, are alternatively provided on keycaps 12, and 102, respectively.

In an effort to reduce steps in manufacturing, and promote the integration of parts, the magnetic keycap assembly 10 may be structurally configured such that each of the plurality of keycap magnets 20, 24, 26, 28 are incorporated or encased within each of the plurality of tabs 28, 30, 32, 36, and each of the plurality of keybase magnets 46, 48, 50, 52 are incorporated or enclosed within each of the plurality of apertures 54, 56, 58, 60 so that each keycap magnet releasably, magnetically attaches to a respective keybase magnet while the plurality of tabs 28, 30, 32, 36 extend within each corresponding aperture 54, 56, 58, 60 in a press-fit engagement. In one alternative embodiment, the plurality of tabs 28, 30, 32, 34, and plurality of apertures 54, 56, 58, 60 provided on the keycap 12 and keybase 14, respectively, may by completely eliminated, and a plurality of stubs each including a stub magnet (not shown), provided at four distant corners on the planar, bottom surface 18 of cap body 16. Each keybase magnet 20, 24, 26, 28 is disposed at a predetermine depth within a corresponding notch provided at the four corners of the keybase 14, to provide an aperture for correspondingly receiving each of the plurality of stubs therein. Upon attaching the keycap 12 to the keybase 14, the stub magnets of each stub are magnetically affixed to a corresponding keybase magnet provided within each notch while the plurality of stubs extend within each corresponding notch in a press-fit engagement. It is appreciated that a similar arrangement and configuration for reducing steps of manufacturing, and promoting integration of parts may also be applied to the magnetic keycap assembly 100.

Figure 10:
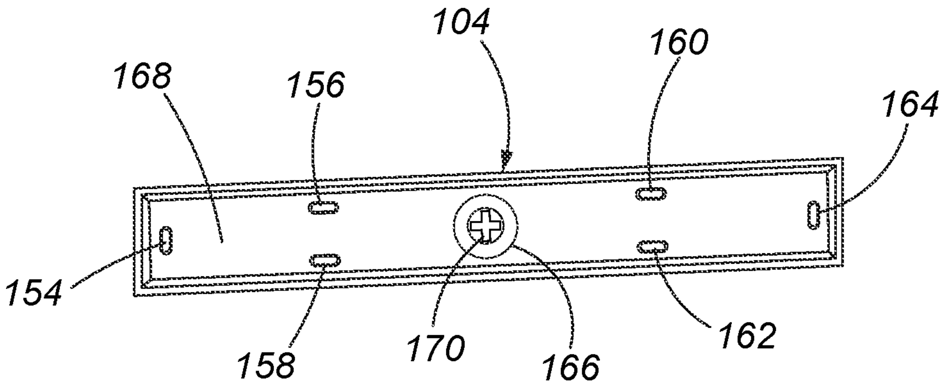
FIG. 10 is a bottom view of the keybase of FIG. 7, showing the stem connector, and the plurality of apertures readily receiving the plurality of tabs therein.
Figure 11A:
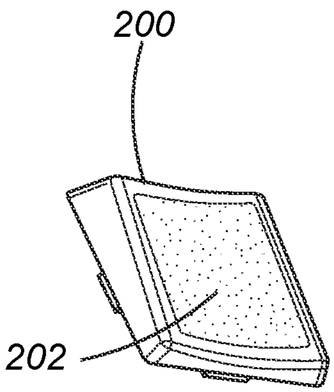
FIGS. 11A-11D are perspective views of a variety of interchangeable keycaps readily attachable to designated keybases for customizing a magnetic keycap assembly, in accordance with one embodiment.
Figure 11B:
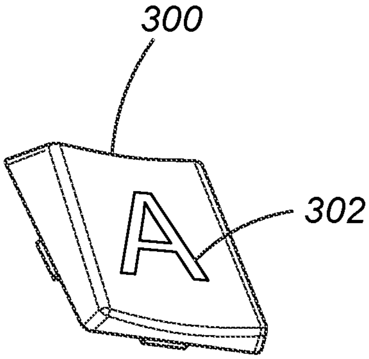
Figure 11C:
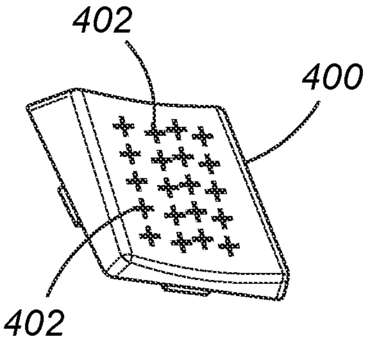
Figure 11D:
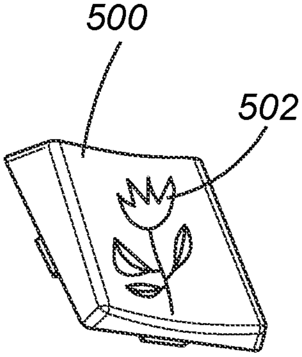
Figure 12A:
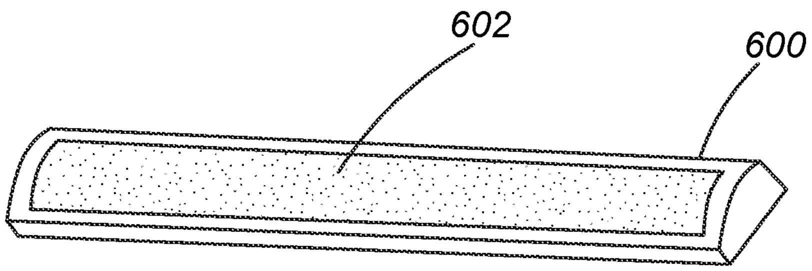
FIGS. 12A-12D are perspective views of a variety of interchangeable keycaps readily attachable to designated keybases for customizing a magnetic keycap assembly defining a spacebar, in accordance with an alternative embodiment.
Figure 12B:
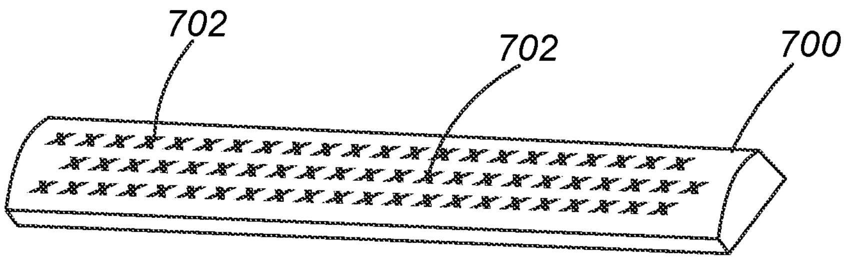
Figure 12C:
Figure 12D:
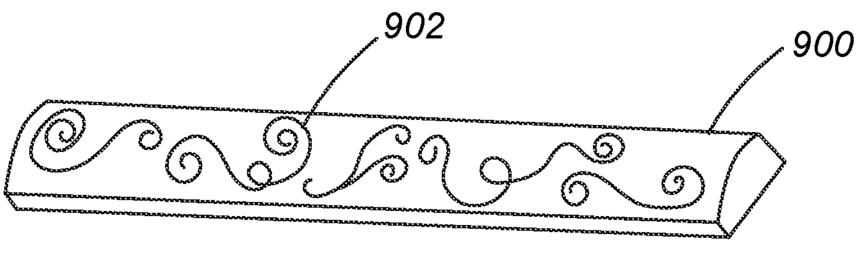

Turning now to FIGS. 7 and 10, there is shown an exploded, bottom, perspective view of the magnetic keycap assembly 100, and a bottom view of keybase 104, respectively. Keybase 104 includes a stem connector 166 for attaching the magnetic keycap assembly 100 to the stem of a key switch provided on a mechanical keyboard. The stem connector 166 extends downwards from a central region of a bottom surface 168 of base body 132, and is surrounded by sidewalls 134, 136, 138 and 140. Stem connector 166 may comprise the same or different constructional shape and dimension as that of stem connector 66 but is generally governed by various switching attributes including for example, keycap stroke, key travel distance, and point of actuation, and the type of key switch profile used. A stem opening 170 is provided within the body of the stem connector 166 for attaching the keybase 104 directly to a stem of a key switch (not shown) of a mechanical keyboard. In an exemplary embodiment, the stem opening 170 replicates the shape of a plus sign, but in other cases may comprise a circular or rectangular shape. The dimensional size and shape of the stem opening 170 is typically constructed in accordance with the brand or type of mechanical key switch employed on designated mechanical keyboards. It is noted that the bottom view of FIG. 10, further illustrates the strategic orientation and location of the plurality of apertures 154, 156, 158, 160, 162, 164 provided on the planar, upper surface 133 of the keybase 104 to accommodate receiving the plurality of tabs 120, 122, 124, 126, 128, 130 therein. In particular embodiments, stem connector 166 may comprise any type of keyboard connector, such as, for example, integrated mounts, snap-on mounts, Cherry MX mounts, Hirose Cherry mounts, customer cruciform mounts, tee and bar mounts, Alps mounts, IBM Beam Spring mounts, Electric mounts, RAFI mounts, Mitsumi mounts, Key Tronic mounts, Topre mounts, Clare-Pendar mounts, Marquardt mounts, or any other keyboard key connector. Although the figures show a single stem connector 166, in particular embodiments (not shown), there are two or three stem connectors 166.

An added level of design is provided for users to quickly, and easily customize the magnetic keycap assembly 10, 100 using a variety of interchangeable keycaps, as illustrated in FIGS. 11A-11D, and 12A-12D. Users often spend a great deal of time in front of computer keyboards for work or pleasure. For added fun, and to make the experience more appealing, users can personalize mechanical keyboards by enhancing the aesthetic appeal and/or improving on certain ergonomic features. For example, some interchangeable keycaps 200, 400, 600, 700, may include certain ergonomic features comprising a rubber material 202, 602 added to the top surface of a keycap 200, 600, or frictional elements 402, 702 that comprise indentations, nubs, dimples, ridges, or protrusions provided on the upper surface of the keycaps, to enhance frictional contact and prevent slippage. One interchangeable keycap 800 may include a gel padding 802 provided on the upper surface to promote added comfort. A unique combination of artistic designs can be provided to improve the mundane appearance of standard keycaps and enhance aesthetic appeal. For example, interchangeable keycaps 500, 900 may include a variety of designs 502, 902 comprising a variety of different colors, artistic forms, characters, motifs, images, patterns, or other indicia using any well-known technique. Letters, numbers, characters, indicia, or other artistic features may be applied to interchangeable keycaps using any process or technique including for example, dye sublimation, pad printing, laser etching, or double shot printing. Further, interchangeable keycaps 200, 300, 400, 500, 600, 700, 800, 900 may include a variety of different structural features to replicate certain physical attributes or features associated with characters, motifs, figures, animals, articles, or other features. For example, one interchangeable keycap may include various structural features for mimicking flames, teeth, horns, or other appearances. In one example, an interchangeable keycap 300 includes a raised, enlarged letter denoted at 302 to better accommodate users with visual impairment. In some embodiments, the interchangeable keycap 300 may include alternative symbols, such as commonly used symbols or letters in used in different languages to allow for programing keys, and easily swapping the keycap to identify programmed symbols, numbers, or letters. In some embodiments, a key is reprogrammed as a macro key to simulate multiple keystrokes and the user can easily swap the keycap to identify the particular macro.

In some embodiments (not shown), keybase 14,104 and/or keycap 12, 102 is decorated using a variety of different colors, artistic forms, characters, motifs, images, patterns, or other indicia using any well-known technique. Letters, numbers, characters, indicia, or other artistic features may be applied anywhere on the keybase 14, 104 and/or keycap 12, 102 using any process or technique including for example, dye sublimation, pad printing, laser etching, or double shot printing. In some embodiments, this allows the key to visually denote multiple functions without cluttering the top of keycap, such as, for example, a red keycap paired with a blue keybase indicates two functions for the same key. Alternatively, a small symbol on the front of the keybase can also designate one function of the key while another replaceable keycap indicates another function. In one embodiment, the control key's keybase (or keycap) can be, for example, yellow and certain keys on the keyboard can have corresponding yellow keybases with symbols on the keybases indicating to the user that when the control key is pressed those alternative functions are activated for each key with a yellow keybase. In such embodiments, the modular nature of the system allows the keycaps to remain a neutral or different color.

Dimensional characteristics and materials employed to construct the magnetic keycap assembly 10, 100 including the keycap 12, 102 and keybase 14, 104 are governed by various design factors including, but not limited to, actuation or operation forces, activation point, total travel distance, tactile position, and reset point. Cap body 16, 105 of keycap 12, 102, respectively, and base body 35, 132, of keybase 14, 104, respectively, may each be fabricated from a durable plastic material including acrylonitrile butadiene styrene (ABS) or polybutylene terephthalate (PBT). Other materials may be used to construct the magnetic keycap assembly 10, 100 including for example, wood, aluminum, glass, ceramic, nylon, or a hard rubber material. Either or both the keycap 12, 102, and/or keybase 14, 104 may be translucent, transparent, or opaque. Also, either or both the keycap 12, 102, and/or keybase 14, 104 may include luminous characteristics including for example, a bioluminescent material, light emitting diodes, or a reflective material. It is understood that each magnetic keycap assembly 10 may comprise any keycap profile including any of a cherry, DSA, KAM, KAT, MT3, OEM, or SA profile.

It is also understood that the planar bottom surfaces 18, 108, and planar top surfaces 36, 133 of keycap 12, 102, and keybase 14, 104, respectively, may comprise other surface formations including for example, a convex and concave attachment configuration. Further, it is appreciated that the keycap attachments and keybase attachments may each comprise other types of attachment configurations including but not limited to, protrusions, notches, latches, spring detents, snaps, friction attachments, bayonet attachments, peg and hole attachment, or clips.

Since many modifications, variations, and changes in detail can be made to the described preferred embodiments of the invention, it is intended that all matters in the foregoing description and shown in the accompanying drawings be interpreted as illustrative and not deemed to be limiting. Furthermore, it is understood that any of the features presented in the embodiments may be integrated into any of the other embodiments unless explicitly stated otherwise. The scope of the invention should be determined by the appended claims and their legal equivalents. Modifications, additions, or omissions may be made to the systems, apparatuses, and methods described herein without departing from the scope of the disclosure. For example, the components of the system may be integrated together, or separated. Moreover, the operations of the systems and apparatuses disclosed herein may be performed by more, fewer, or other components and the methods described may include more, fewer, or other steps.

What is claimed is:

1. A magnetic keycap assembly comprising:

a keycap including a cap body having a top surface, a bottom surface opposite said top surface, and a first plurality of magnets provided on said bottom surface, each of said first plurality of magnets disposed at respective corners of said bottom surface;

a keybase including a base body having an upper surface integral with four sidewalls, each of said four sidewalls extending downwards, a lower surface opposite said upper surface, a stem connector extending downwards from a central region of said lower surface, said stem connector surrounded by said four sidewalls, and a second plurality of magnets provided on said upper surface;

wherein each of said second plurality of magnets are disposed at respective corners of said upper surface; and wherein said keycap is removably attached to said keybase such that said first plurality of magnets magnetically attach to said second plurality of magnets, said keybase removably attachable to a key switch on a mechanical keyboard via, said stem connector.

2. The magnetic keycap assembly of claim 1, further including a first plurality of attachments provided on said bottom surface, each of said first plurality of attachments interposed between each of said first plurality of magnets, and a second plurality of attachments provided on said upper surface, each of said second plurality of attachments interposed between each of said second plurality of magnets, each of said first plurality of attachments engaging each of said second plurality of attachments when said keycap is attached to said keybase.

3. The magnetic keycap assembly of claim 2, wherein said first plurality of magnets comprises at least two magnets each embedded within or affixed to said bottom surface, said second plurality of magnets comprises another at least two magnets each embedded within or affixed to said upper surface, said first plurality of attachments comprising at least two tabs, and said second plurality of attachments comprising at least two apertures, each of said at least two tabs inserted within each of said at least two apertures providing a snap-fit, or press-fit attachment when said keycap is removably attached to said keybase.

4. The magnetic keycap assembly of claim 3, wherein said at least two magnets comprises at least four magnets, said another at least two magnets comprises at least four magnets, said at least two tabs comprises at least four tabs, and said at least two apertures comprises at least four apertures, each of said four tabs removably inserted within each of said four apertures to provide a snap-fit, or press-fit frictional attachment when said cap body is attached to said base body.

5. The magnetic keycap assembly of claim 4, wherein said cap body, and said base body each comprise an elongate rectangular shape defining a space bar on a mechanical keyboard, each of said at least four magnets comprising six magnets, said at least two tabs comprising six tabs, and said at least four apertures comprising six apertures, said six tabs aligned with and removably inserted within said six apertures to provide a snap-fit or press-fit frictional attachment when said cap body of said keycap is removably attached to said base body of said keybase.

6. The magnetic keycap assembly of claim 2, wherein said keycap comprises an interchangeable keycap.

7. The magnetic keycap assembly of claim 6, wherein said interchangeable keycap comprises a square shape, a rectangular shape, or elongate rectangular shape defining a space bar on a mechanical keyboard, and wherein said interchangeable keycap includes any of letters, numbers, characters, motifs, designs, patterns, different colors, images, lights, light emitting diodes, indentations, protrusions, padding, braille, frictional elements, embossed structural features, or indicia.

8. A magnetic keycap assembly comprising:

a keycap including a top surface, a planar bottom surface opposite said top surface, a first plurality of magnets, and a first plurality of attachments, said first plurality of magnets and said first plurality of attachments provided on said planar bottom surface;

a keybase including a planar upper surface integral with four sidewalls, each of said four sidewalls extending downward, a lower surface opposite said planar upper surface, a stem connector extending downwards from a central region of said lower surface, a second plurality of magnets, and a second plurality of attachments, said second plurality of magnets, and said second plurality of attachments provided on said planar upper surface; and wherein said keycap is removably attached to said keybase such that each of said first plurality of magnets magnetically attach to each of said second plurality of magnets, and each of said first plurality of attachments are removably inserted within each of said second plurality of attachments to provide a snap-fit or press-fit frictional attachment, said keybase removably attachable to a key switch on a mechanical keyboard via, said stem connector.

9. The magnetic keycap assembly of claim 8, wherein said first plurality of magnets comprises at least two magnets each embedded within or affixed to said planar bottom surface, said second plurality of magnets comprises another at least two magnets each embedded within or affixed to said planar upper surface, said first plurality of attachments comprising at least two tabs, and said second plurality of attachments comprising at least two apertures, each of said at least two tabs inserted within each of said at least two apertures when said keycap is removably attached to said keybase, each of said first plurality of magnets interposed between each of said first plurality of attachments on said planar bottom surface, and each of said second plurality of magnets interposed between each of said second plurality of attachments on said planar upper surface.

10. The magnetic keycap assembly of claim 9, wherein said at least two magnets comprises at least four magnets, said another at least two magnets comprises at least four magnets, said at least two tabs comprises at least four tabs, and said at least two apertures comprises at least four apertures.

11. The magnetic keycap assembly of claim 10, wherein said keycap and said keybase each comprise an elongate rectangular shape defining a space bar on a mechanical keyboard, each of said at least four magnets comprising six magnets, said at least two tabs comprising six tabs, and said at least four apertures comprising six apertures, each of said six tabs aligned with and removably inserted within each of said six apertures, respectively, to provide a snap-fit or press-fit attachment when said keycap is removably attached to said keybase.

12. The magnetic keycap assembly of claim 9, wherein said keycap comprises a plurality of interchangeable keycaps each comprising a square shape, a rectangular shape, or elongate rectangular shape defining a space bar on a mechanical keyboard, said plurality of interchangeable keycaps including any of letters, numbers, characters, motifs, designs, patterns, different colors, images, lights, light emitting diodes, indentations, protrusions, padding, braille, frictional elements, embossed structural features, or indicia.

13. A magnetic keycap assembly comprising:

a keycap including a cap body having a top surface, a planar bottom surface opposite said top surface, four keycap magnets each embedded within, or affixed to, said planar bottom surface, each of said four keycap magnets located at designated corners of said planar bottom surface of said cap body, and four keycap attachments each situated about peripheral edges on said planar, bottom surface, each of said four keycap attachments interposed between each of said four keycap magnets;

a keybase including a base body having a planar, upper surface integral with four sidewalls, a lower surface opposite said planar, upper surface, a stem connector extending down from a central region of said lower surface, four keybase magnets embedded within, or affixed to, said planar upper surface, each of said keybase magnets located at designated corners of said planar upper surface of said base body, and four keybase attachments each situated about peripheral edges on said planar upper surface, said four keybase attachments interposed between each of said four keybase magnets; and wherein said keycap is removably attached to said keybase such that said four keycap magnets magnetically attach to said four keybase magnets, and said four keycap attachments engage with said four keybase attachments, said keybase removably attachable to a key switch on a mechanical keyboard via, said stem connector.

14. The magnetic keycap assembly of claim 13, further including two keycap magnets to provide six keycap magnets, each of said six keycap magnets situated at designated corners, and about peripheral edges on said planar, bottom surface of said cap body, two keycap attachments to provide six keycap attachments, each situated about peripheral edges on said planar, bottom surface, said six keycap attachments interposed between said six keycap magnets, two keybase magnets to provide six keybase magnets, each situated at designated corners, and about peripheral edges on said planar, upper surface of said base body, and two keybase attachments to provide six keybase attachments each situated about peripheral edges on said planar, upper surface, said six keybase attachments interposed between each of said six keybase magnets, said keycap and said keybase each including an elongate rectangular shape comprising a space bar on a mechanical keyboard.

15. The magnetic keycap assembly of claim 13, wherein each of said four keycap attachments, comprises a tab, and each of said four keybase attachments comprises an aperture formed within said planar surface of said upper surface, each tab removably inserted within each aperture to provide a snap-fit, or press-fit attachment configuration when said keycap is removably attached to said keybase.

16. The magnetic keycap assembly of claim 13, wherein said keycap comprises a plurality of interchangeable keycaps including any of letters, numbers, characters, motifs, designs, patterns, different colors, images, lights, light emitting diodes, indentations, protrusions, padding, braille, frictional elements, embossed structural features, or indicia.

* * * * *